(No Model.)

D. READ.
TONGUE SUPPORT.

No. 296,621. Patented Apr. 8, 1884.

WITNESSES
Phil C. Dieterich
W. F. O'Beirne

INVENTOR
Daniel Read
By F. D. McCleary
Attorney

UNITED STATES PATENT OFFICE.

DANIEL READ, OF NEW SALEM, KANSAS.

TONGUE-SUPPORT.

SPECIFICATION forming part of Letters Patent No. 296,621, dated April 8, 1884.

Application filed November 22, 1883. (No model.)

*To all whom it may concern:*

Be it known that I, DANIEL READ, of New Salem, in the county of Cowley and State of Kansas, have invented certain new and useful Improvements in Tongue-Supports for Vehicles; and I do hereby declare the following to be a full, clear, and exact description of the invention, such as will enable others skilled in the art to which it pertains to make and use the same.

My invention relates to devices for supporting the tongue of a wagon or other vehicle to relieve the team of the weight of the tongue, and also to prevent damage to the pole or tongue by the resting of the latter upon the ground when not in use.

The invention consists in the features of construction and combination of parts hereinafter fully described, and pointed out in the claim.

Figure 1:
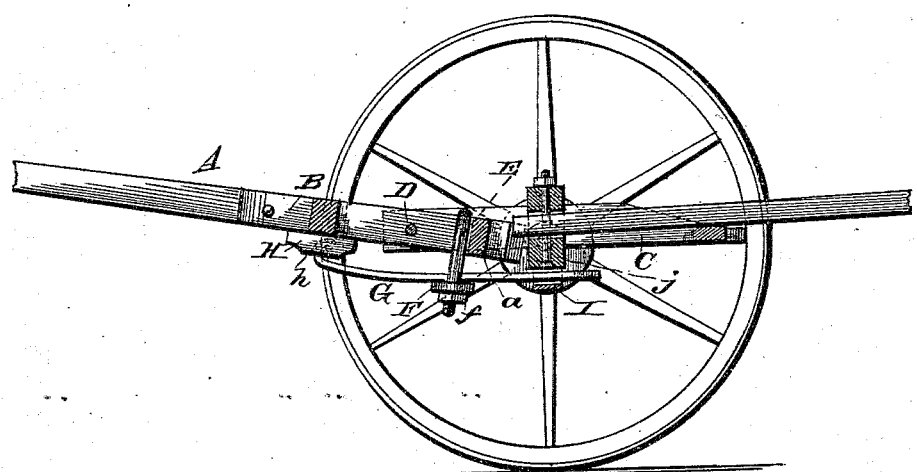
Figure 2:
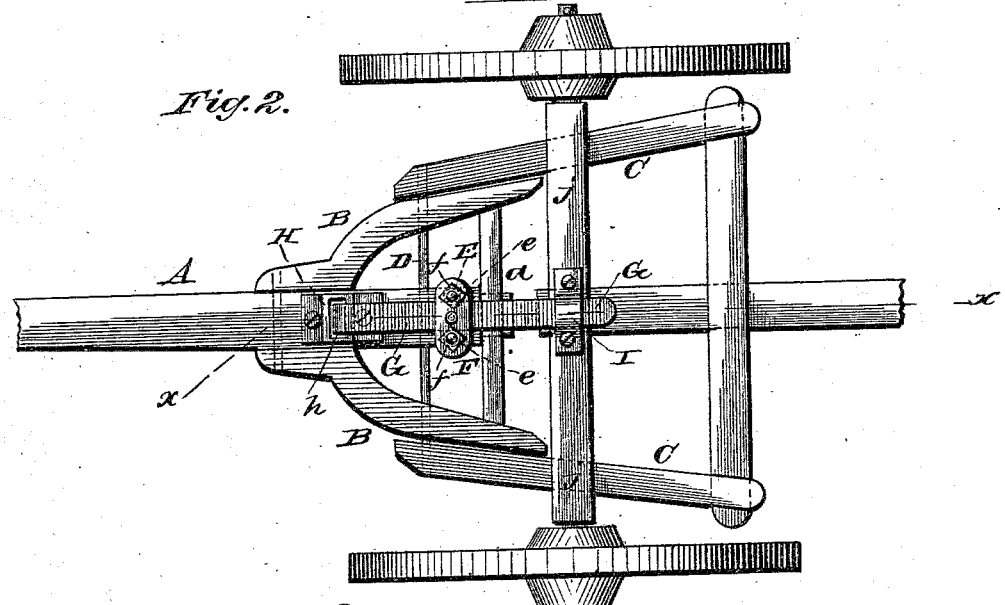
Figure 3:
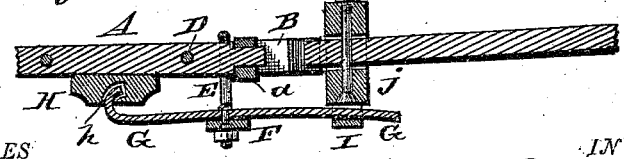

In the drawings, Figure 1 is a side elevation, partly in section, of a part of the running-gear of a vehicle provided with my improvement. Fig. 2 is a reverse plan view of the same, and Fig. 3 is a section on the line $x\ x$ of Fig. 2.

A represents the tongue of the wagon, provided with the usual cross-bar, $a$, and hounds B B, and pivotally secured between the forward hounds, C C, of the running-gear by a rod, D, passing through said hounds C C, the tongue A, and its hounds B B.

E represents a yoke embracing the rear end of the tongue. The ends of the yoke E pass through perforations $e\ e$ in a plate, F, and said plate is removably secured to said yoke by means of nuts $f\ f$, screwed onto the threaded ends of the yoke.

G represents a spring pivotally secured to the plate F, and upwardly bent at its forward end to enter a recess, $h$, formed in a block, H, secured to the under side of the tongue near the rear end of the latter. The rear end of the spring G is held by a guard-strip, I, secured to the front axle, $j$, of the vehicle.

From the construction thus described it will be apparent that the spring G will support the tongue in a horizontal position, and that when necessary said spring may be removed.

The rear guard-strip, I, serves to retain the spring in place without preventing its free longitudinal movement.

The recessed block H forms a convenient catch device for the free upturned end of the spring.

The device is not only simple, effective, and durable, but may be manufactured and supplied to the trade at a small cost, and is adapted to be applied to any form of vehicle.

Having fully described my invention, what I desire to claim and secure by Letters Patent is—

The combination, in a tongue-support for vehicles, of the axle having the guard plate or strip secured to its under side, the tongue having the block secured to its under side, formed with the curved or segmental recess, the flat spring having its front end curved to correspond to said recess, and received and protected thereby, and having its rear end acting against and retained by the said guard-plate, the approximately U-shaped yoke embracing the rear end of the tongue, and cross-plate adjustable on the ends of the yoke and pivotally connected with the spring, all arranged and operating substantially as set forth.

In testimony whereof I have signed this specification in the presence of two subscribing witnesses.

DANIEL READ.

Witnesses:
IDA G. TREZISE,
JNO. D. PRYOR.